(12) United States Patent
Susnjara

(10) Patent No.: US 11,207,808 B1
(45) Date of Patent: Dec. 28, 2021

(54) SYSTEMS AND METHODS FOR PRODUCING PARTS AT ELEVATED TEMPERATURES

(71) Applicant: Thermwood Corporation, Dale, IN (US)

(72) Inventor: Kenneth J. Susnjara, Dale, IN (US)

(73) Assignee: Thermwood Corporation, Dale, IN (US)

(*) Notice: Subject to any disclaimer, the term of this patent is extended or adjusted under 35 U.S.C. 154(b) by 0 days.

(21) Appl. No.: 16/915,624

(22) Filed: Jun. 29, 2020

(51) Int. Cl.
| | |
|---|---|
| *B29C 43/36* | (2006.01) |
| *B29C 43/02* | (2006.01) |
| *B29C 35/02* | (2006.01) |
| *B29C 64/10* | (2017.01) |
| *B33Y 10/00* | (2015.01) |
| *B33Y 80/00* | (2015.01) |
| *B29K 101/12* | (2006.01) |

(52) U.S. Cl.
CPC .......... *B29C 43/3607* (2013.01); *B29C 35/02* (2013.01); *B29C 43/02* (2013.01); *B29C 64/10* (2017.08); *B33Y 10/00* (2014.12); *B33Y 80/00* (2014.12); *B29K 2101/12* (2013.01); *B29K 2901/12* (2013.01)

(58) Field of Classification Search
CPC ............................. B29C 43/3607; B29C 43/02
USPC ......................................................... 264/219
See application file for complete search history.

(56) References Cited

U.S. PATENT DOCUMENTS

| | | | |
|---|---|---|---|
| 5,494,551 A * | 2/1996 | Stevens | B29C 33/20 |
| | | | 156/394.1 |
| 7,731,816 B2 | 6/2010 | Oldani et al. | |
| 7,810,539 B2 | 10/2010 | Mischler et al. | |
| 8,151,854 B2 | 4/2012 | Oldani | |
| 8,534,338 B2 | 9/2013 | Oldani et al. | |
| 8,954,180 B2 | 2/2015 | Oldani | |
| 10,906,253 B2 * | 2/2021 | Matlack | B29C 70/443 |
| 2007/0044899 A1 | 3/2007 | Tingley | |
| 2008/0006017 A1 | 1/2008 | Rindels | |
| 2010/0200168 A1 | 8/2010 | Oldani et al. | |
| 2018/0050502 A1 | 2/2018 | Oldani | |
| 2020/0055266 A1 * | 2/2020 | Hirabayashi | B29C 43/3607 |

OTHER PUBLICATIONS

English Translation of DE3346332A1 (Year: 1983).*
Sloan, "Big additive machines tackle large molds," CompositesWorld, Jun. 11, 2019, (8 pages).

* cited by examiner

*Primary Examiner* — Matthew J Daniels
*Assistant Examiner* — Hana C Page
(74) *Attorney, Agent, or Firm* — Bookoff McAndrews, PLLC

(57) ABSTRACT

A mold assembly for producing a part includes a first section, a second section movably coupled to the first section, and a cavity defined by the first section and the second section, the cavity being shaped to receive a part while the first section and the second section are movably coupled to each other. The mold assembly includes a joint formed by adjacent surfaces of the first section and the second section and a seal extending along the joint.

14 Claims, 10 Drawing Sheets

SYSTEMS AND METHODS FOR PRODUCING PARTS AT ELEVATED TEMPERATURES

TECHNICAL FIELD

Aspects of the present disclosure relate to apparatus and methods for fabricating components. In some instances, aspects of the present disclosure relate to apparatus and methods for fabricating components (such as, e.g., automobile parts, medical devices, machine components, consumer products, etc.) via additive manufacturing techniques or processes, which may be referred to as 3D printing manufacturing techniques or processes.

BACKGROUND

Additive manufacturing techniques and processes generally involve the buildup of one or more materials to make a net or near net shape (NNS) object, in contrast to subtractive manufacturing methods. Though "additive manufacturing" is an industry standard term (ASTM F2792), additive manufacturing encompasses various manufacturing and prototyping techniques known under a variety of names, including e.g., freeform fabrication, 3D printing, rapid prototyping/tooling, etc. Additive manufacturing techniques may be used to fabricate simple or complex components from a wide variety of materials. For example, a freestanding object can be fabricated from a computer-aided design (CAD) model.

A particular type of additive manufacturing is commonly known as 3D printing. One such process commonly referred to as Fused Deposition Modeling (FDM) comprises a process of melting a relatively thin layer of thermoplastic material, and applying this material in layers to produce a final part. This is commonly accomplished by passing a continuous thin filament of thermoplastic material through a heated nozzle, which melts and applies the material to the structure being printed. The heated material may be applied to the existing structure in thin layers, melting and fusing with the existing material to produce a solid finished product.

The filament used in the aforementioned process is generally produced using a plastic extruder, which is comprised of a specially designed steel screw configured to rotate inside a heated steel barrel. Thermoplastic material, in the form of small pellets, is introduced into one end of the rotating screw. Friction from the rotating screw, combined with heat from the barrel, softens the plastic, which is then forced under pressure through a small round opening in a die attached to the front of the extruder barrel. This extrudes a string of material which is cooled and coiled up for use in the 3D printer.

Melting a thin filament of material in order to 3D print an item may be a slow process, which may be suitable for producing relatively small items or a limited number of items. The melted filament approach to 3D printing may be too slow to manufacture large items. However, the fundamental process of 3D printing using molten thermoplastic materials may offer advantages for the manufacture of large parts or a large number of items.

In some instances, 3D printing a part may involve a two-step process. In some aspects, 3D printing may utilize a large print bead to achieve an accurate final size and shape. This two-step process, commonly referred to as near-net-shape, may begin by printing a part to a size slightly larger than needed, then machining, milling or routing the part to the final size and shape. The additional time required to trim the part to a final size may be compensated for by the faster printing process.

Print heads of additive manufacturing machines used to print thermoplastic material in relatively large beads generally include a vertically-mounted extruder and a print nozzle to direct round print bead downward onto a surface and/or part being printed. In some cases, the flowable material, such as, e.g., molten thermoplastic material, may be infused with a reinforcing material (e.g., strands of fiber) to enhance the material's strength. The flowable material, while hot and pliable, may be deposited upon a substrate (e.g., a mold), and then pressed down or otherwise flattened, and/or leveled to a consistent thickness. These traditional print heads may include an oscillating plate surrounding the nozzle, the plate being configured to oscillate vertically to flatten the bead of material against the previous layer of material. Print heads may also include a roller mechanism, which may be more efficient for joining layers and squeezing air from between the layers. The deposition process may be repeated so that each successive layer of flowable material is deposited upon an existing layer to build up and manufacture a desired structure for a component or part. In order to achieve proper bonding between printed layers, it may be necessary to ensure the temperature of the previously-deposited layer is within a certain range. For example, the previously-deposited layer may need to have cooled by an appropriate amount and thereby solidified sufficiently to support the weight of the new layer. However, this previously-deposited layer may also be sufficiently warm to soften and fuse with the new layer, thus producing a solid part such as a mold.

Additive manufacturing, using reinforced thermoplastic composite material, may be desirable for the production of relatively large open molds, including molds suitable for production of thermoset components. Parts, such as thermoset parts, may be produced with the use of a heated autoclave. Manufacturing with the use of heated autoclaves may involve a process that makes use of a mold having a mold cavity that represents the size and shape of the component desired. Such molds may be produced using additive manufacturing, for example by depositing a reinforced polymer material that is able to withstand autoclave temperatures (e.g., thermal processing temperatures), without distorting or softening. A thermoset material for forming the part, such as epoxy, may be provided in the form of a fiber mat infused with liquid thermoset material. This thermoset (or other suitable material) may be placed or laid in the mold cavity. The mold cavity with the thermoset material therein may then be covered with a sheet of flexible polymer, such as polyethylene, which is sealed around the exterior of the mold cavity. Additional materials may be added between the sealed polymer sheet and the thermoset material to facilitate evacuation of air trapped between the sealed polymer sheet and the mold cavity surface. At this point, a vacuum may be applied to the area between the mold cavity surface and the seated polymer sheet. This vacuum may evacuate the air between the polymer sheet and the mold cavity surface. As air is evacuated (e.g., from the mold cavity), ambient air pressure may tend to force the sealed polymer sheet tightly against the surface of the mold cavity, compressing the thermoset material between the polymer sheet and the mold cavity surface tightly against the mold cavity surface.

The amount of force generated by this process (e.g., force acting to compress the thermoset material), may be dependent on the ambient air pressure surrounding the mold. Accordingly, when conducting molding processes inside an autoclave, the ambient pressure may be raised significantly by sealing and pressurizing the autoclave. Therefore, the force compressing the thermoset material may be controllably increased, which may result in a finished component that is relatively strong and dense.

In some aspects, vacuum may be applied to an interior of the mold at a period of time that at least partially overlaps a period of time during which positive pressure is applied to an interior of the autoclave. Accordingly, it may be desirable to ensure that the mold is free of pores and configured to sustain vacuum, without any air leaks, even at the relatively high pressures generated in the autoclave.

The above-described molding process may generally involve relatively slowly heating pressured air inside the autoclave to a temperature at which the thermoset material undergoes a chemical reaction, for example, converting from a highly viscous liquid to a solid. This heating process, which may occur over a relatively long period of time, may also heat the thermoplastic mold. The thermoplastic mold may expand as it is heated and contract as it cools.

This expansion and contraction of the mold and the part may be associated with several problems. For example, the mold may tend to expand to its maximum size before the thermoset material fully hardens or cures (e.g., chemically converts from a liquid to a solid). Therefore, it may be desirable to ensure that the dimensions of the mold are sized such that, when the mold reaches its maximum expansion, the mold has a desired size and shape. This may be desirable, for example, because the size and shape of the expanded mold may determine the dimensions of the produced part. Accordingly, it may be desirable to machine the mold at room temperature to a size somewhat smaller than required for the finished part. As the molded part cools it also tends to contract at a rate that is significantly less a contraction rate associated with the mold. It may be desirable to take this contraction into account when determining the dimensions of the mold at room temperature.

Due to the tendency of the mold to contract at a rate greater than the contraction rate of the molded part, which may be completely rigid after molding, can create additional problems. For example, some part shapes or geometries may tend to cause the part to be compressed and/or squeezed out of a cavity, for example, as the mold contracts faster than the part. Other part shapes or geometries may tend to trap the part in the mold such that, if the mold contracts faster than the trapped part, large forces may be generated between the part and the mold. These forces may be sufficiently large to crush the molded part, crack the mold, or both.

In order to address these potential issues, some approaches involve constructing the mold from the same material as the part so that both expand and contract at the same rate. This approach is generally significantly more expensive than producing the mold using additive manufacturing. Therefore, it is desirable to develop a method by which 3D printed thermoplastic molds could be used to produce such parts, such methods allowing the use of parts and molds formed of different materials.

SUMMARY

Aspects of the present disclosure relate to, among other things, methods and apparatus for fabricating components via additive manufacturing or 3D printing techniques. Each of the aspects disclosed herein may include one or more of the features described in connection with any of the other disclosed aspects. An object of this disclosure is an approach that uses a large scale 3D printing process to produce a mold, which may be sealed with the use of a frangible sealing material, in such a way that as the mold and part contracting forces developed cause the mold to fracture or separate in a controlled manner.

There are several ways to achieve such fracture and separation, including methods in which the mold is constructed in two or more sections or pieces. The mold pieces may be positioned tightly against each other to form a seam between the pieces. This seam may be sealed with a material that is sufficient to prevent air leaking through the joint so that the required vacuum can be established and maintained.

In some instances, the sealing material may be configured to hold the mold pieces together during the heating and curing cycle but may stretch and/or fracture as the assembly cools and shrinking forces develop. As an alternative, the mold pieces may be held together mechanically using springs or other flexible means which allow the mold pieces to separate upon generation of sufficient force. This approach may involve the use of material for sealing the joints so that the required vacuum may be generated and maintained during the heating and curing process.

In at least some embodiments, the molded thermoset part may have insufficient structural strength to generate a force sufficient to separate or fracture the sealed mold before sustaining damage to itself. In these instances, it may be beneficial to mechanically fracture a frangible seal material holding the mold together. There are various methods of accomplishing this using an externally generated force, such as a hydraulic cylinder or mechanical screw mechanism.

In at least some embodiments, a mechanism may experience expansion and contraction as it heats and cools, the expansion and contraction configured to create forces sufficient to fracture the seal material during cooling without the need for external control.

In one aspect, a mold assembly for producing a part may include a first section, a second section movably coupled to the first section, and a cavity defined by the first section and the second section, the cavity being shaped to receive a part while the first section and the second section are movably coupled to each other. The mold assembly may also include a joint formed by adjacent surfaces of the first section and the second section and a seal extending along the joint.

In another aspect, a mold assembly may include a first section, a second section coupled to the first section, and a space between the first section and second section to receive a part. The mold assembly may also include a sealing material applied to a seam between the first section and the second section. The sealing material may be configured to maintain a seal for a part placed in the space when the first section and second section abut each other and release the seal when the first section and the second section are spaced apart from each other.

In yet another aspect, a method for molding a part with a mold assembly may include connecting a first mold section to a second mold section, applying a sealing material to the first mold section and the second mold section, and placing a part within a part-receiving cavity formed by the first mold section and the second mold section. The method may also include heating the part within the part-receiving cavity during a curing process, the heating causing the part-receiving cavity to enlarge due to thermal expansion of at least one of the part or the mold and maintaining a seal during at least a portion of the curing process with a sealing material applied to the first mold section and to the second mold section.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

The present disclosure is drawn to, among other things, methods and apparatus for fabricating multiple components via additive manufacturing or 3D printing techniques. Specifically, the methods and apparatus described herein may comprise an approach that employs a large-scale 3D-printing process to produce a mold, with the use of a sealing material, in such a way that as the mold and part contracting forces developed cause the mold to fracture or separate in a controlled manner.

Figure 1:
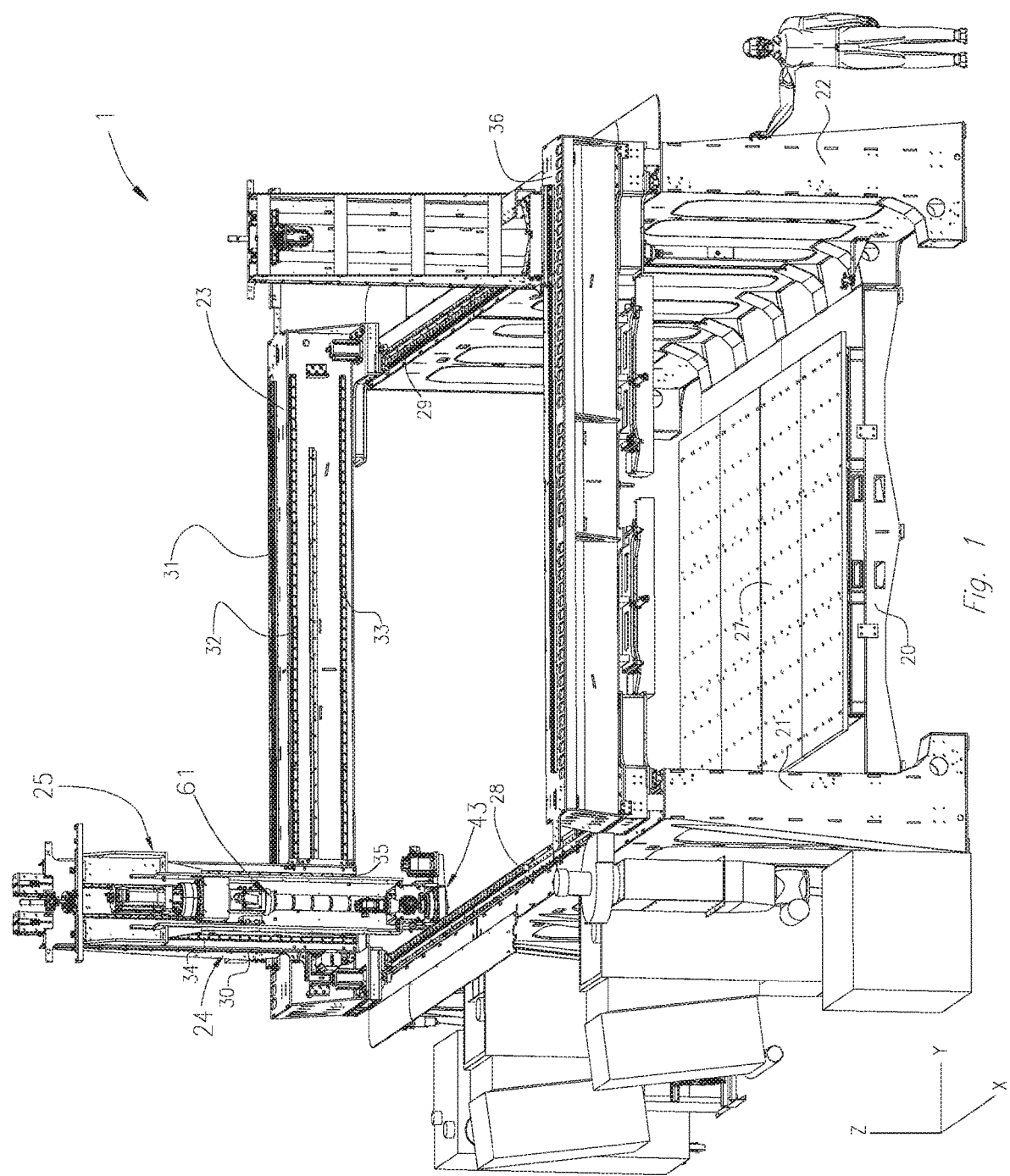
FIG. 1 is a perspective view of an exemplary CNC machine or additive manufacturing apparatus for use with an additive manufacturing process for forming articles, according to an aspect of the present disclosure.

Referring to FIG. 1, an additive manufacturing apparatus, such as CNC machine 1, may include a bed 20 having a pair of transversely spaced side walls 21 and 22, a printing gantry 23, a trimming gantry 36, a carriage 24 mounted on printing gantry 23, a carrier 25 mounted on carriage 24, an extruder 61, and an applicator assembly 43 mounted on carrier 25. Printing gantry 23 and trimming gantry 36 may be supported on side walls 21 and 22. A horizontal worktable 27 having a support surface disposed in an x-y plane may be supported on bed 20 between side walls 21 and 22. Printing gantry 23 and trimming gantry 36 may be disposed so as to extend along a y-axis, supported at respective ends thereof on end walls 21 and 22. Printing gantry 23 and trimming gantry 36 may be movable with respect to an x-axis on a set of shared, approximately parallel guide rails 28 and 29 provided on the upper ends of side walls 21 and 22. Printing gantry 23 and trimming gantry 36 may each be displaceable by one or more (e.g., a set of) servomotors mounted on the printing gantry 23 and trimming gantry 36, respectively. For example, printing gantry 23 and trimming gantry 36 may be operatively connected to tracks provided on the side walls 21 and 22 of the bed 20. Carriage 24 may be supported on printing gantry 23 and provided with a support member 30 mounted on and displaceable along one or more guide rails 31, 32, and 33 provided on the printing gantry 23. Carriage 24 may be displaceable along a y-axis on along or more guide rails 31, 32, and 33 via a servomotor mounted on the printing gantry 23 and operatively connected to support member 30. Carrier 25 may be mounted on a set of spaced, vertically-disposed guide rails 34 and 35 supported on carriage 24 for displacement of the carrier 25 relative to carriage 24 along a z-axis. Carrier 25 may be displaceable along the z-axis by a servomotor mounted on the carriage 24 and operatively connected to the carrier 25.

Figure 2:
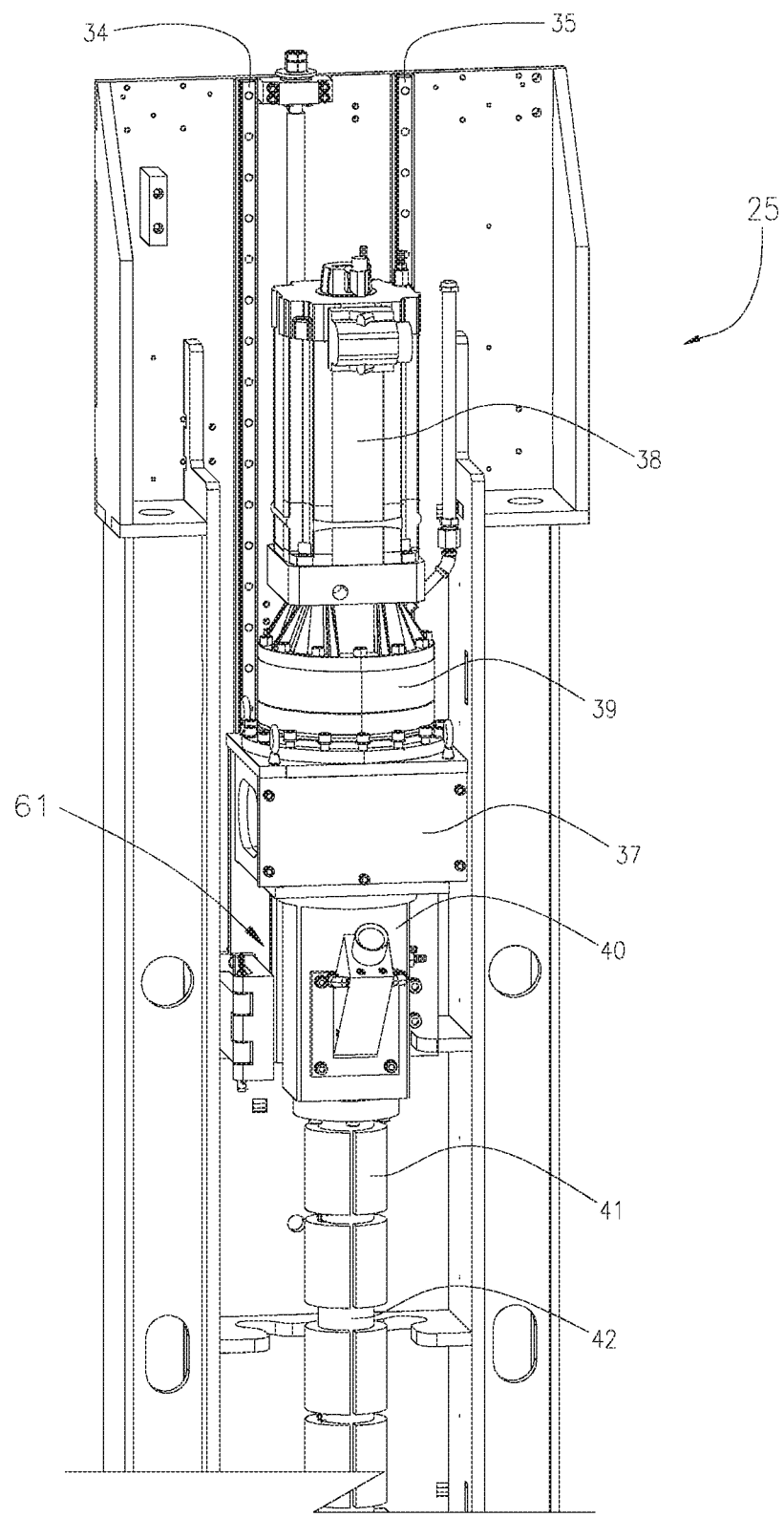
FIG. 2 is a perspective view of an exemplary carrier and extruder assembly of the exemplary additive manufacturing apparatus shown in FIG. 1.

As best shown in FIG. 2, extruder 61 may be mounted, in a linearly-movable manner, to carrier 25. For example, extruder 61 may be movably mounted on a set of rails 34 and 35 (FIG. 1) via suitable bearings. A servomotor 38 may drive an extruder screw of extruder 61 through a gearbox 39 attached to transition housing 37. Extruder 61 may receive thermoplastic pellets at the feed housing 40 so that the extruder screw transfers the thermoplastic material down through the barrel 42 where it is melted by the friction of the screw and heaters 41. This melted thermoplastic material may flow, via extruder 61, to a positive displacement melt pump or gear pump 62 (FIG. 3).

Figure 3:
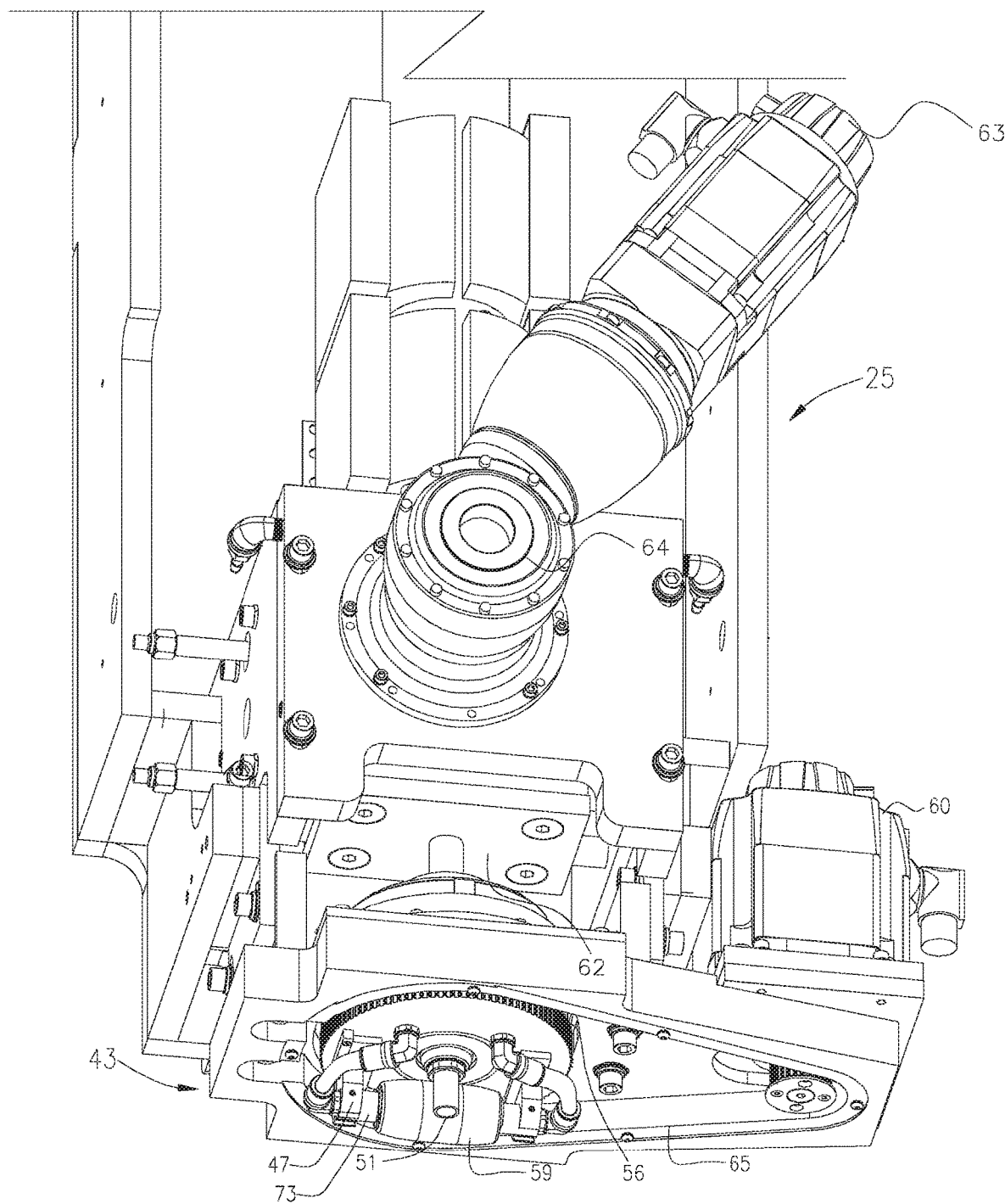
FIG. 3 is an enlarged perspective view of an exemplary carrier and applicator head assembly of the exemplary additive manufacturing apparatus shown in FIG. 1.

As best shown in FIG. 3, gear pump 62 may be securely mounted to the bottom of carrier 25. Gear pump 62 may be driven by a servomotor 63 through a gearbox 64, and may receive molten plastic (e.g., thermoplastic material) from extruder 61 (FIG. 2), and meter precise amounts of thermoplastic material at predetermined flow rates to nozzle 51 to print the part (e.g., a mold 80 as described below). An applicator head 43 may be attached at a position below gear pump 62. Applicator head 43 may include a bead shaping roller 59, rotationally mounted in carrier bracket 47. Roller 59 may provide a means for flattening and leveling an oversized bead of fluid material (e.g., molten thermoplastic) extruded out of nozzle 51. Carrier bracket 47 may be adapted to be rotationally displaced by means of a servomotor 60, through a pulley or sprocket 56 and belt or chain 65 arrangement.

Figure 4:
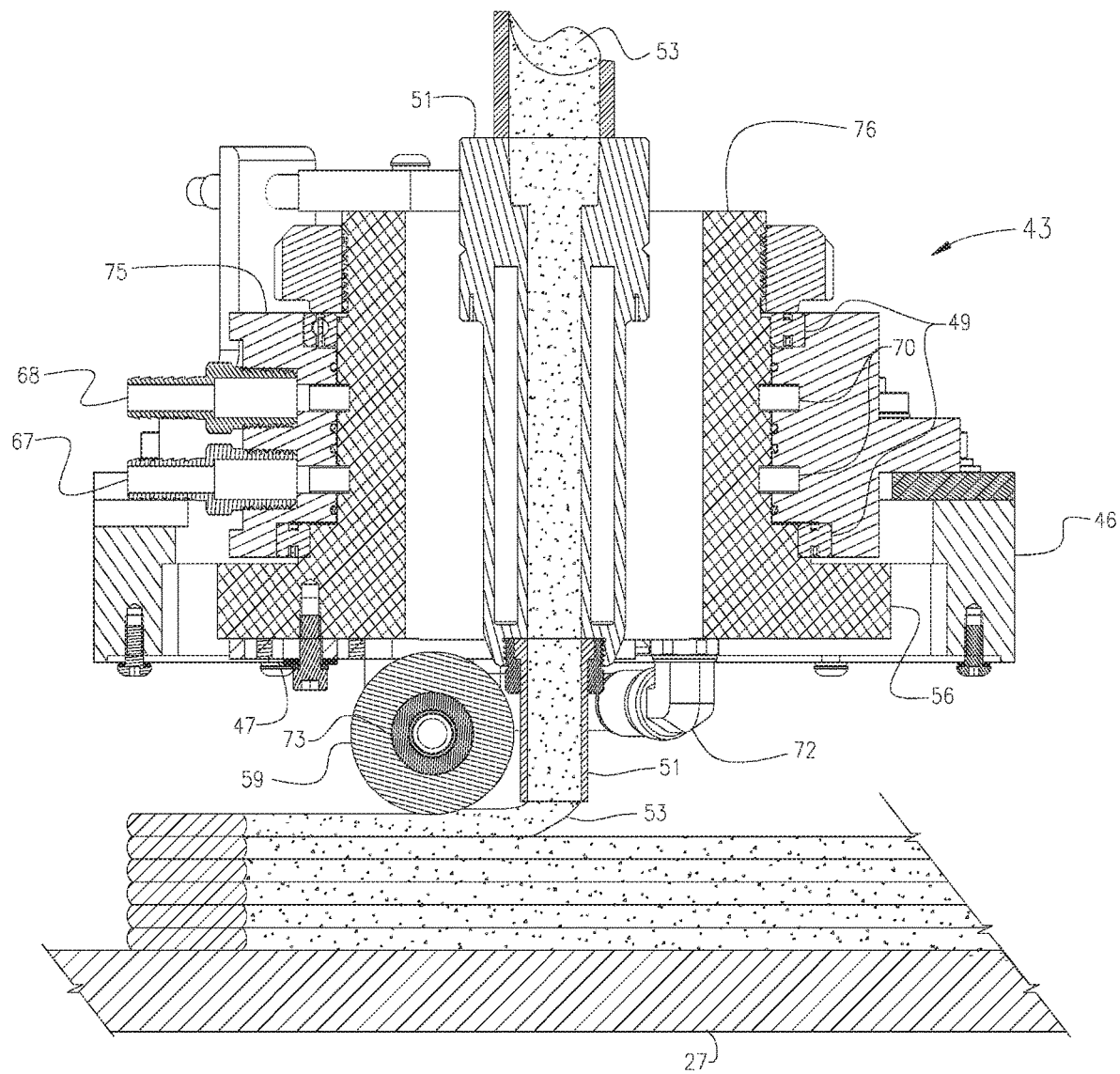
FIG. 4 is an enlarged cross-sectional view of the applicator head assembly shown in FIG. 3.

With reference to FIG. 4, applicator head 43 may include a housing 46 with rotary union mounted therein. Pulley or sprocket 56 may be machined into the inner hub 76 of the rotary union. An inner hub 76 may have an opening with a sufficiently large diameter to allow the heated print nozzle 51 to pass therethrough. Inner hub 76 may rotate on a set of bearings 49 contained within outer housing 75 of the rotary union. The compression roller assembly may be attached to the inner hub 76 of the rotary union so that the compression roller 59 rotates about the print nozzle 51. The rotary union may also contain barb fittings 67 and 68 ported into coolant passages 70 that encompass or surround the inner hub 76 and the inside of the outer housing 75 of the rotary union. The coolant passages 70 may extend to quick disconnect fittings 72 in fluid communication with an axle 73 of compression roller 59.

As best shown in FIGS. 2-4, an oversized molten bead of flowable material (e.g., molten thermoplastic) may be provided under pressure from a source disposed on carrier 25 (e.g., gear pump 62) or another source. The bead of flowable material may be provided to applicator head 43. Thus, gear pump 62, (or another source of flowable material), may be securely connected to, and in communication with, nozzle 51. In use, the flowable material 53 (e.g., thermoplastic material) may be heated sufficiently to form a large molten bead of material, which may be extruded through applicator nozzle 51 to form large, uniform, and smooth rows of deposited material on surface 27. Such beads of molten material may be flattened, leveled, and/or fused to adjoining layers with substantially no trapped air by bead-shaping compression roller 59 with the layers forming 3D printed products, including relatively large open molds (e.g., mold 80 described below).

Figure 5:
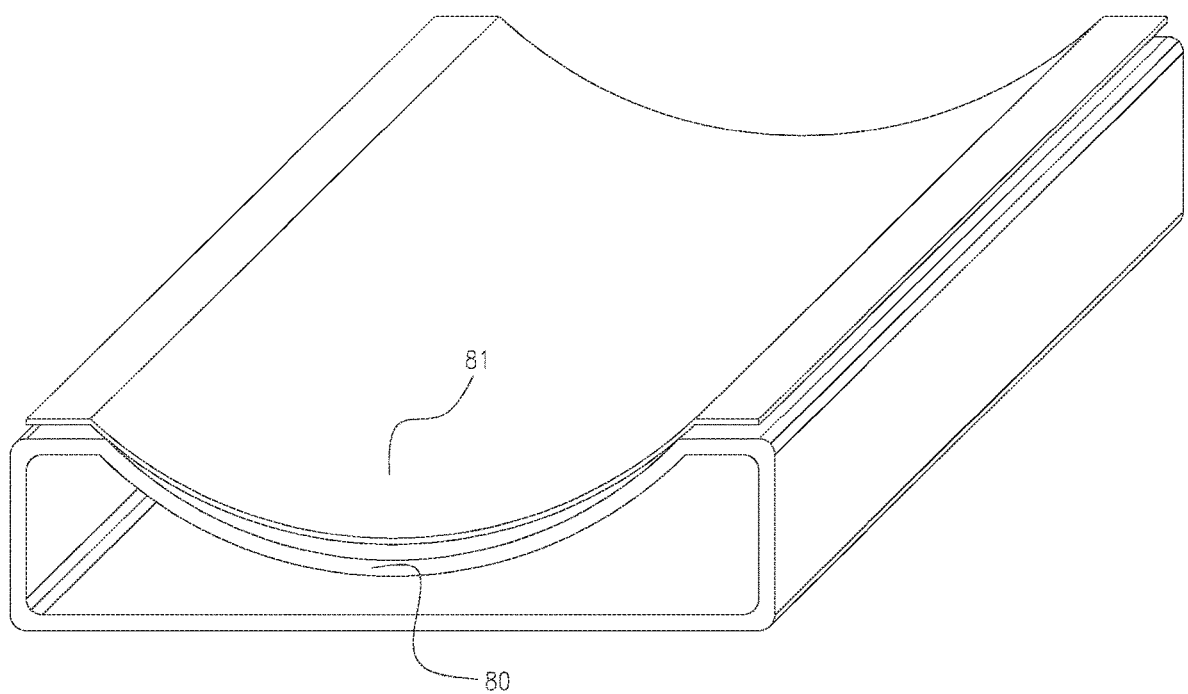
FIG. 5 is a perspective view of an exemplary mold assembly with a part lifting off the mold as the mold contracts.
Figure 6:
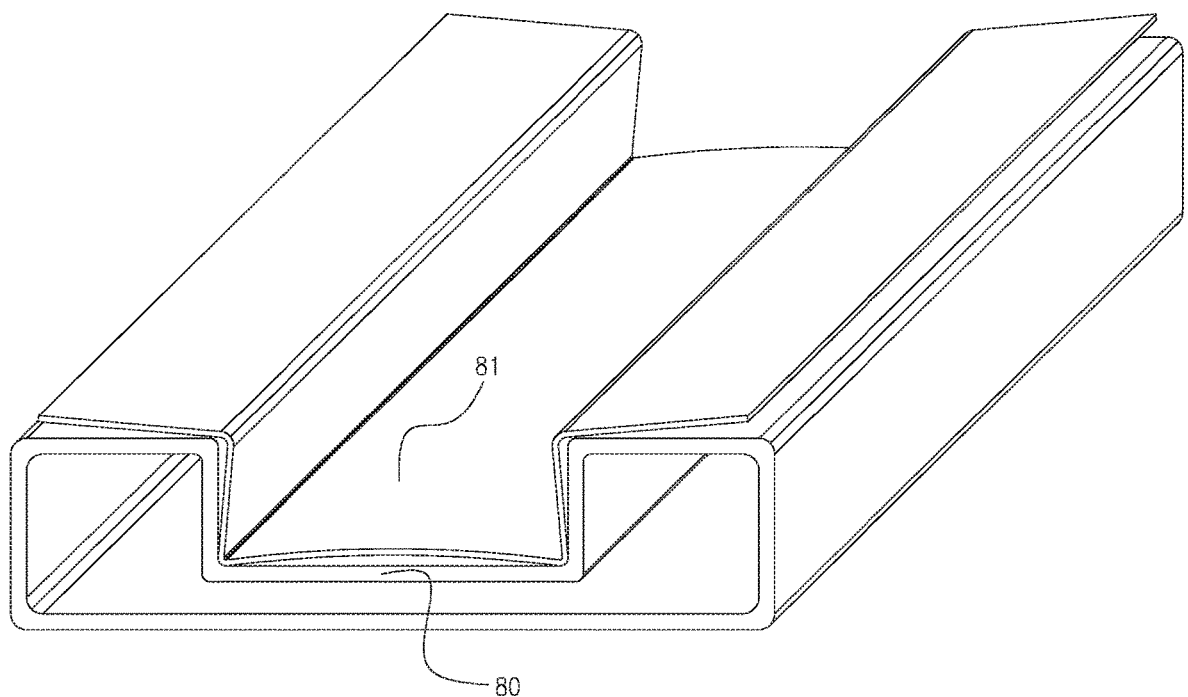
FIG. 6 is a perspective view of an exemplary mold assembly with a part being crushed in the mold as the mold contracts.

In some aspects, additive manufacturing systems, including the above-described additive manufacturing apparatus, may be configured to produce relatively large open molds. These molds may be used, for example, in the production of thermoset components. In particular, molds formed by additive manufacturing may be useful for providing molds formed with a different material than the part intended to be produced with the mold. Such molds may be shaped such that the geometry of the part may tend to force the part away from the mold cavity or trap the part within the mold cavity (which may tend to either crush the molded part or crack the mold). For example, when mold 80 is not made of the same material as the part 81, the part 81 may tend to lift off the mold 80, as shown in FIG. 5, due to mold 80 shrinking faster, and/or to a greater extent, as compared to part 81. As shown in FIG. 6, depending on the particular shape of mold 80, part 81 may tend to become trapped in mold 80, and may eventually crush part 81 or crack the mold 80 due to the mold 80 shrinking faster, and/or to a greater extent, as compared to part 81.

FIGS. 7-10 illustrate exemplary mold assemblies including molds 80 according to aspects of the present disclosure. Mold 80 may be formed, for example, of a thermoplastic material deposited by the additive manufacturing apparatus described above with respect to FIGS. 1-4. Mold 80 may be a relatively large open mold forming an open space or cavity 78. A pair of laterally-extending walls of mold 80 may define cavity 78 and define opposing first and second boundaries of cavity 78. These walls may surround part 81 when the part 81 is inserted into cavity 78 (e.g., in a vertically downward direction). As cavity 78 may form an open cavity, for example a cavity open in an upward direction, a sheet of material (not shown) may be placed around cavity 78 to form a seal around cavity 78 to facilitate a molding process with an autoclave, for example.

Figure 7:
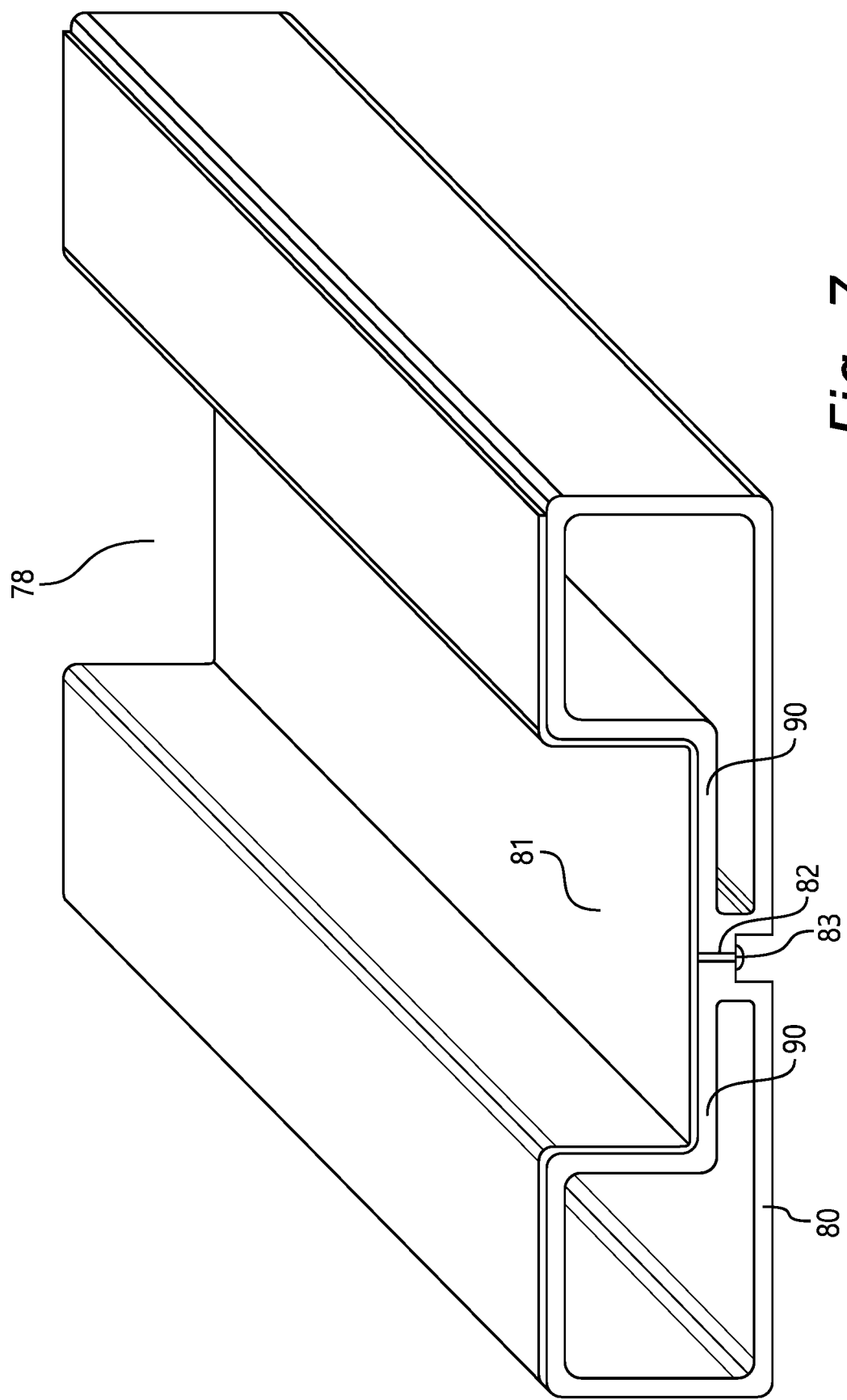
FIG. 7 is a perspective view of an exemplary mold assembly formed with separate sections employing seal stretching to allow the mold to conform to the size of a part.

In some aspects, as shown in FIG. 7, thermoplastic mold 80 may be constructed as a plurality of sections 90. Mold 80 may be connected with a sealing material 83, such that contracting forces of mold 80 and part 81 may cause one or more components of mold 80 to fracture or separate in a controlled manner. In order to facilitate separation of mold 80, mold 80 may be constructed in two or more pieces or sections 90. However, mold 80 may be formed of a different number of sections, including three sections 90, four sections 90, or more. In at least some configurations, sections 90 of mold 80 may be positioned tightly against each other while seam 82 may extend between each section 82. Seam 82 may be sealed with a material 83, such as vulcanized silicone of a formulation that can withstand curing temperatures, sufficient to prevent air transmission or leaks through the joint formed at seam 82 so that vacuum may be established and maintained (e.g., during a vacuum molding process). In some aspects, seam 82 may include a pair of opposing surface of sections 90 that may be brought into contact with each other. Sealing material 83 may extend along a joint between each pair of sections 90, and may oppose cavity 78. For example, when cavity 78 forms an upward-facing cavity, sealing material 83 may extend along a bottom surface of mold 80 formed by an intersection of a plurality (e.g., a pair) of abutting mold sections 90. Therefore, when a sealing sheet is placed to seal cavity 78, sealing material 83 may maintain the seal and facilitate the application of vacuum to remove air between the polymer sheet and the surface of mold 80.

In some configurations, sealing material 83 may hold sections 90 of mold 80 together during heating and curing cycles (e.g., while mold 80 is placed in an autoclave), but may be configured to stretch and/or fracture as the assembly cools and shrinking forces develop. When no part 81 is present, mold 80 may be configured to withstand heating and curing cycles without such fracturing. However, when a part 81 is present (e.g., a part initially provided as a viscous liquid that converts to a rigid solid during curing), the expanded dimensions of part 81 may fracture a seal of mold 80. Such fracturing may occur when the dimensions of the mold 80 shrink during cooling, as the cured part 81 may remain substantially the same size (e.g., experience little or no reduction in size). In particular, the force generated between part 81 and the shirking mold 80 may result in the fracture of the seal (e.g., a fracture in sealing material 83). For example, FIG. 7 illustrates a mold assembly including a mold 80 in which sections 90 are separated and broken apart, which may occur during cooling, as part 81 may contract at a slower rate as compared to mold 80 or may experience substantially no contraction. This may cause sealing material 83 to stretch or remain stretched, thereby allowing mold 80 to conform to the size of part 81. Additionally, sealing material 83 may be configured to maintain a vacuum while sections 90 are separated from each other (e.g., during heating), to the ability of sealing material 83 to seal seam 82.

Figure 8:
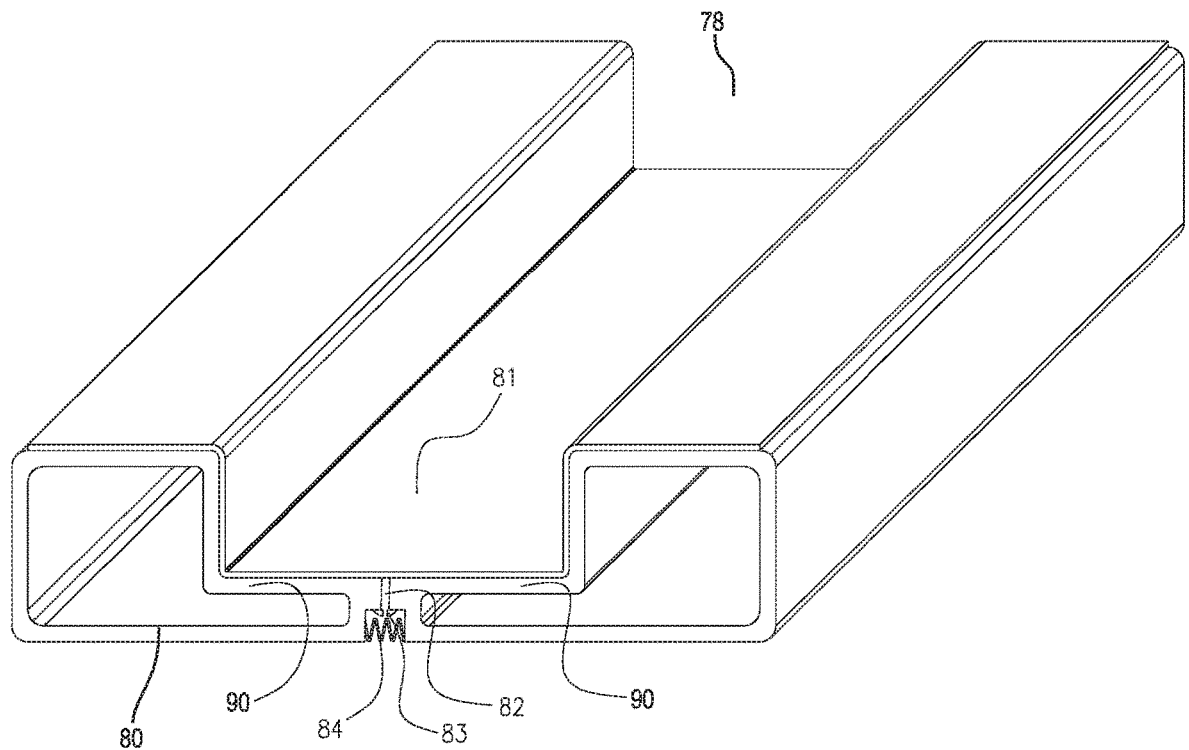
FIG. 8 is a perspective view of an exemplary mold assembly formed with separate sections and resilient members to allow the mold to conform to the size of a part.

In some aspects, as shown in FIG. 8, sections 90 of mold 80 may be mechanically secured or held together using one or more resilient members such as springs 84 or other flexible means. As shown in FIG. 8, springs 84 may be configured to allow mold sections 90 to separate from each other upon generation of sufficient force (e.g., as applied by part 81 to walls of mold sections 90). In some aspects, mechanical sealing of joints of mold 80, such as a joint at seam 82, may facilitate the application of vacuum. Such vacuum may be generated and maintained, for example, during heating and curing of part 81 within mold 80. In the configuration illustrated in FIG. 8, a mold assembly may include one or more springs 84 secured to sections 90 so as to stretch as sections 90 move away from each other due to forces applied by part 81. In particular, part 81 may be in contact with mold 80 such that expansion of part 81 applies force to the walls of mold 80 that define cavity 78. The force generated by contact between part 81 and mold 80 may be sufficient to cause sections 90 to move apart along seam 82 and split mold 80 into two pieces or halves formed by sections 90. In some aspects, the force generated by the expansion of part 81, and contact between part 81 and mold 80, may be sufficient to mechanically fracture and/or break the seal formed by a frangible seal material 83. This fracture may occur during cooling, for example.

Figure 9:
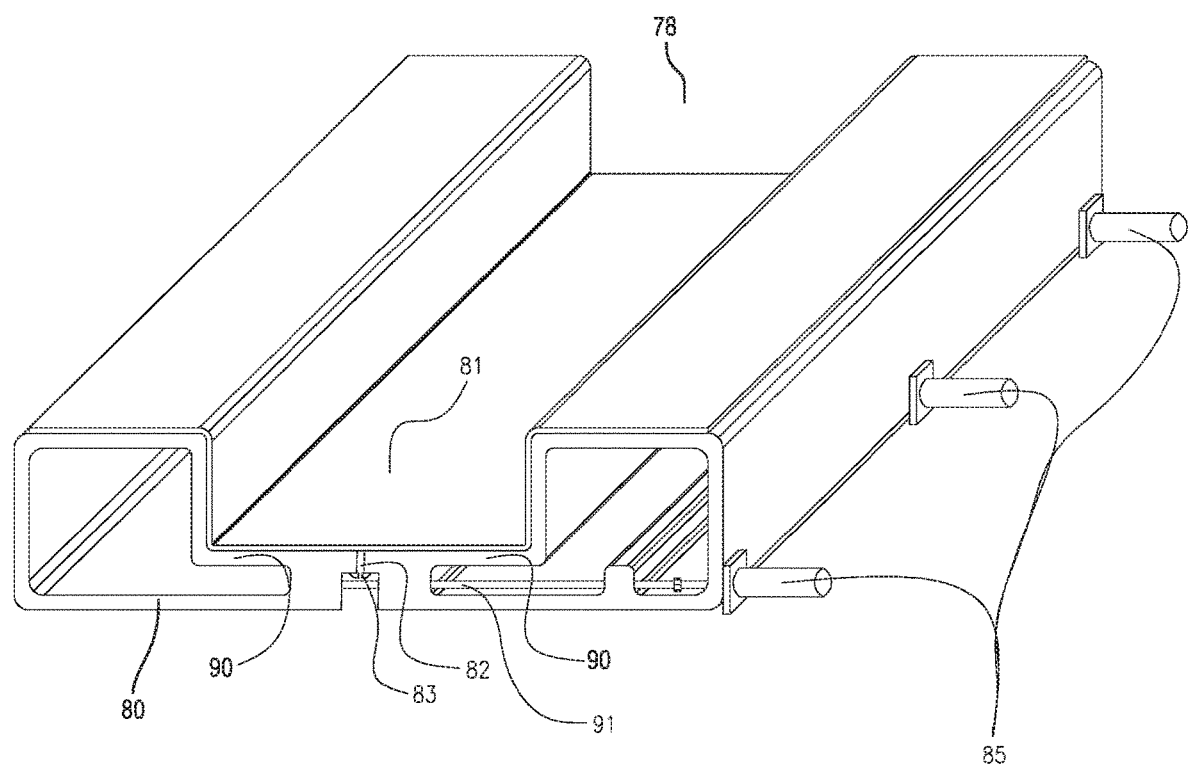
FIG. 9 is a perspective view of an exemplary mold assembly formed with separate sections and hydraulic cylinders to allow the mold to conform to the size of a part.

In some aspects, part 81 (e.g., a molded thermoset part) may have insufficient structural strength to generate a sufficiently force to fracture seal material 83 of sealed mold 80 without experiencing damage. For molding such parts 81, it may be beneficial to mechanically fracture a frangible seal material 83 disposed between sections 90. An exemplary mold assembly for providing an externally-generated force is shown in FIG. 9, for example, in which one or more hydraulic cylinders 85 may be secured to mold 80. However, if desired, a mechanical screw mechanism may be secured to mold 80 instead of, or in addition to, hydraulic cylinders 85.

As shown in FIG. 9, a hydraulic cylinder 85 (three shown in FIG. 9) may be attached to a side surface of an outer wall of a section 90 of mold 80. Rods 91 or other moveable members of each hydraulic cylinder 85 may be hydraulically-driven and configured to push against an opposite side surface of an adjacent section 90 of mold 80 so as to separate the mold 80 into two pieces and break seal 83. The hydraulic cylinder 85 mechanism may be configured to separate sections 90 during cooling or at other times during a molding process, and may thereby provide sufficient space for thermoset part 81. One or more suitable electronically-controlled valves and control devices may be configured to cause rods 91 of hydraulic cylinders 85 to extend, in a controllable manner, during cooling, so as to break or fracture seal material 83.

Figure 10:
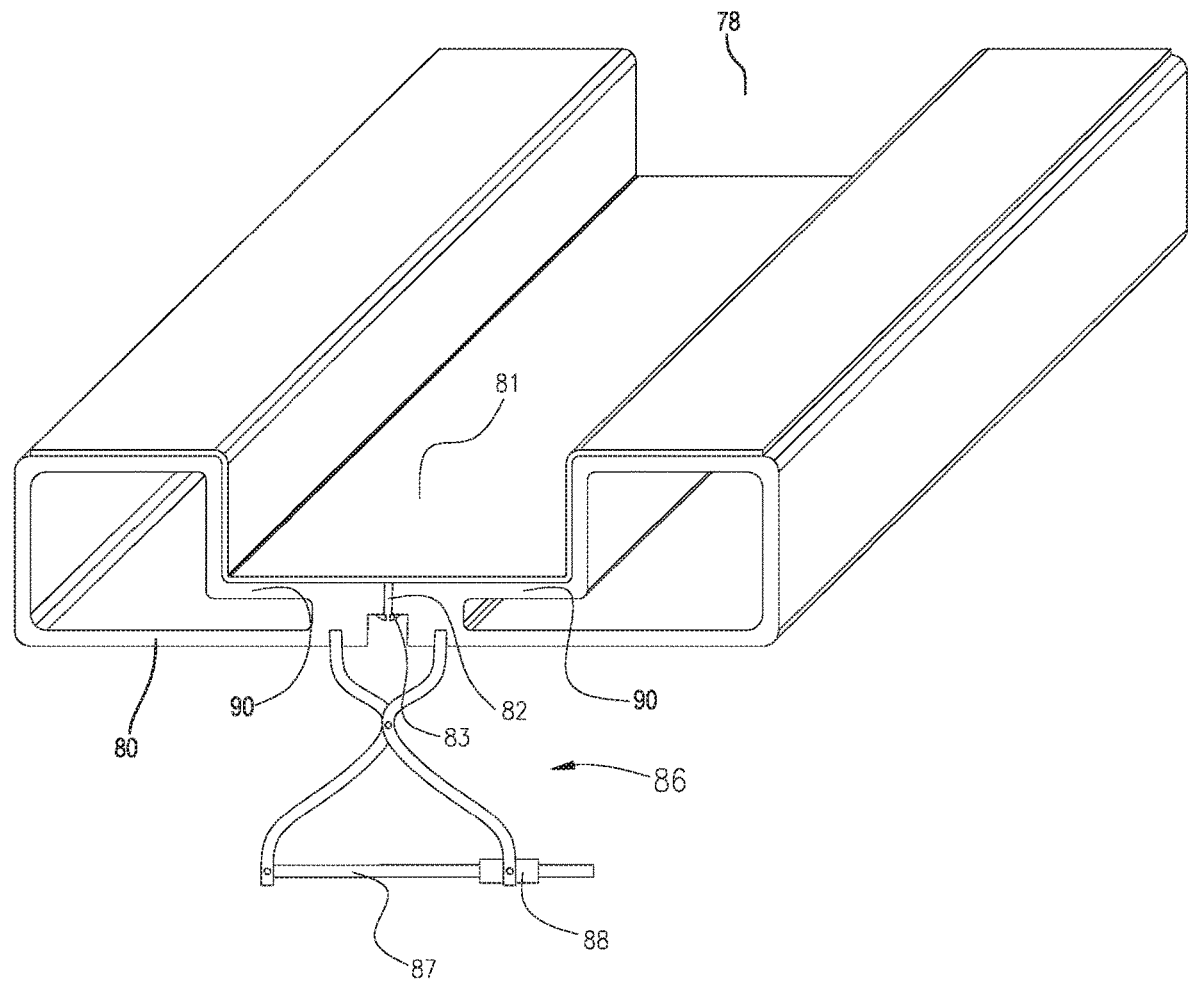
FIG. 10 is a perspective view of an exemplary mold assembly formed with separate sections and a scissor mechanism to allow the mold to conform to the size of a part.

FIG. 10 illustrates another exemplary mold assembly for separating sections 90 of mold 80. Mechanical devices may be secured to mold 80 to separate mold sections 90 based on temperatures within an autoclave generated in accordance with a predetermined temperature profile. For example, such mechanical devices may be configured to generate force sufficient to fracture material 83 when exposed to elevated temperatures of such a predetermined temperature profile.

In an exemplary mechanical device, expansion and contraction (e.g., due to thermal cycling) of a relatively long rod 87 may drive a scissor mechanism 86. Rod 87 may be constructed of a rigid material that expands and contracts with changes in temperature at a rate sufficient to drive scissor mechanism 86. A portion of scissor mechanism 86 including rod 87 and a slide mechanism 88 may form an actuator side of scissor mechanism 86, while a side of scissor mechanism 86 connected to mold sections 90 may form an actuated or driven side of scissor mechanism 86. Thus, motion of the actuated side may cause a corresponding motion of the actuated side to separate sections 90.

As shown in FIG. 10, rod 87 may be rotationally attached to one side of scissor mechanism 86 (e.g., a first leg of scissor mechanism 86 that forms an exemplary moveable member). A first end of rod 87 may be rotationally connected to a first arm of scissor mechanism 86. A second end of rod 87 may pass through a slide mechanism 88 which may be rotationally attached to the other end of the actuator side of the scissor mechanism 86 (e.g., a second leg of scissor mechanism 86 that forms an exemplary moveable member). Slide mechanism 88 may be configured to facilitate sliding motion of rod 87 through the slide mechanism 88 as rod 87 moves outward (e.g., expands so as to extend farther through slide mechanism 88) but locks or prevents withdrawal of rod 87 when rod 87 experiences forces that tend to pull rod 87 in an inward direction (e.g., a direction opposite to the outward direction when rod 87 retracts).

In operation, when mold 80 and scissor mechanism 86 are heated in an autoclave for curing part 81, rod 87 may expand (e.g., with slide end of rod 87), so as to expand and move through slide mechanism 88. After reaching a maximum temperature, and, if desired, holding the maximum temperature for a predetermined period of time, the cure cycle may be completed and the autoclave may begin to cool. As rod 87 cools, it may be prevented from sliding back or retracting through the slide mechanism 88. As a result, scissor mechanism 86, and, in particular, rod 87 and slide mechanism 88, may be configured to create a force that tends to pull the two ends of the actuator side of scissor mechanism 86 together. This force may cause the actuated side or opposite end of scissor mechanism 86 to move apart. In some aspects, as the actuated side of scissor mechanism 86 may include scissor arms secured to each section 90 on opposite sides of mold 80, sufficient force may be generated to separate the two halves or sections 90 of mold 80 and thereby relieve pressure on molded thermoset part 81.

In some aspects, a method for molding a part may include forming a plurality of mold sections 90 with the above-described additive manufacturing apparatus. These mold sections 90 may be connected to each other (e.g., by applying sealing material 83). If desired, one or more separation devices such as a resilient member 84 (FIG. 8), a push-rod and/or hydraulic cylinder (FIG. 9), and a scissor mechanism (FIG. 10), may be connected to mold 80. A part 81 may be placed in cavity 78, and the part 81 and mold 80 may be heated (e.g., within an autoclave). Prior to and/or during this heating, vacuum may be applied to cavity 78, the vacuum being maintained via the seal formed by sealing material 83. This seal may be maintained during at least a portion of a curing process of part 81. During cooling, frangible sealing material 83 may be fractured to break the seal by any of the mechanisms described above.

From the foregoing detailed description, it will be evident that there are a number of changes, adaptations and modifications of the present disclosure which come within the province of those persons having ordinary skill in the art to which the aforementioned disclosure pertains. However, it is intended that all such variations not departing from the spirit of the disclosure be considered as within the scope thereof as limited by the appended claims.

What is claimed is:

1. A mold assembly for producing a part, the mold assembly comprising:
   a first section;
   a second section movably coupled to the first section such that the second section is configured to move away from the first section during expansion of the part;
   a cavity defined by the first section and the second section, the cavity being shaped to receive a part while the first section and the second section are movably coupled to each other;
   a joint formed by adjacent surfaces of the first section and the second section;
   a seal extending along the joint and spaced away from the cavity, the seal being breakable after the second section has moved away from the first section; and
   a separation device that includes a scissor mechanism including a pair of legs configured to increase a distance between the first section and the second section.

2. The mold assembly of claim 1, wherein the joint includes a seam extending between the first section and the second section and the seal includes a sealing material applied along the seam.

3. The mold assembly of claim 1, wherein the separation device is configured to apply a force to linearly separate the first section and the second section.

4. The mold assembly of claim 1, wherein the scissor mechanism includes a rod configured to increase the distance between the first section and the section sliding within a slide mechanism connected to a leg of the pair of legs.

5. The mold assembly of claim 1, wherein the seal is formed with a frangible material that extends to a bottom edge formed by a seam of the joint.

6. The mold assembly of claim 5, wherein the seam extends from the cavity to the bottom edge formed by the seam.

7. The mold assembly of claim 1, wherein the pair of legs are configured to apply a force to linearly separate the first section and the second section.

8. The mold assembly of claim 1, wherein the scissor mechanism includes a sliding rod extending across the pair of legs.

9. The mold assembly of claim 8, wherein the sliding rod extends through a slide mechanism.

10. The mold assembly of claim 9, wherein the sliding rod is fixed to a leg of the pair of legs.

11. The mold assembly of claim 1, wherein the pair of legs forms a first pair of ends connected to the first section and to the second section, respectively, and a second pair of ends that extend away from the first section and the second section.

12. A mold assembly for producing a part, the mold comprising:

a first section;

a second section movably coupled to the first section;

a cavity defined by the first section and the second section, the cavity being shaped to receive a part while the first section and the second section are movably coupled to each other;

a joint formed by adjacent surfaces of the first section and the second section;

a seal extending along the joint; and a scissor mechanism having a pair of legs, a slide mechanism and a rod extending through the slide mechanism and being secured to one leg of the pair of legs, the scissor mechanism being configured to move the first and second sections away from each other.

13. The mold assembly of claim 12, wherein the slide mechanism is configured to permit sliding movement of the rod through the slide mechanism as the rod expands.

14. The mold assembly of claim 13, wherein the slide mechanism is configured to restrict sliding movement of the rod through the slide mechanism as the rod contracts.

\* \* \* \* \*